United States Patent
Hsiao et al.

(10) Patent No.: US 9,568,769 B2
(45) Date of Patent: Feb. 14, 2017

(54) TRANSPARENT LIQUID CRYSTAL DISPLAY DEVICE

(71) Applicant: SHENZHEN CHINA STAR OPTOELECTRONICS TECHNOLOGY CO., LTD., Shenzhen, Guangdong (CN)

(72) Inventors: Yu-Chun Hsiao, Guangdong (CN); Shih Hsiang Chen, Guangdong (CN); Guofu Tang, Guangdong (CN); Quan Li, Guangdong (CN); Chengling Lv, Guangdong (CN); Chaofan Guo, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 211 days.

(21) Appl. No.: 14/417,527

(22) PCT Filed: Dec. 29, 2014

(86) PCT No.: PCT/CN2014/095327
§ 371 (c)(1),
(2) Date: Jan. 30, 2015

(87) PCT Pub. No.: WO2016/095264
PCT Pub. Date: Jun. 23, 2016

(65) Prior Publication Data
US 2016/0170267 A1    Jun. 16, 2016

(30) Foreign Application Priority Data
Dec. 15, 2014  (CN) .......................... 2014 1 0775756

(51) Int. Cl.
G02F 1/1335 (2006.01)
G02F 1/1343 (2006.01)
G06T 19/00 (2011.01)

(52) U.S. Cl.
CPC ..... *G02F 1/133617* (2013.01); *G02F 1/13439* (2013.01); *G02F 2001/133625* (2013.01); *G06T 19/006* (2013.01)

(58) Field of Classification Search
None
See application file for complete search history.

(56) References Cited

U.S. PATENT DOCUMENTS

2003/0193288 A1* 10/2003 Pavlovsky ............ H01J 31/123
                                                            313/506
2006/0077317 A1*  4/2006 Chen ................. G02F 1/133617
                                                             349/70

* cited by examiner

*Primary Examiner* — Richard Kim
(74) *Attorney, Agent, or Firm* — Hauptman Ham, LLP

(57) ABSTRACT

A transparent liquid crystal display device including a transparent liquid crystal cell disposed on a transparent luminous plate is provided. The transparent luminous plate includes a first transparent electrode plate, a fluorescent powder layer, and a cavity layer, which are sequentially disposed on a second transparent electrode plate. An electron generator is disposed on a lateral side of the cavity layer. A viewer is able to see not only an image to be displayed by a screen of the display panel, but also an object or a scene behind the display panel through the screen.

20 Claims, 5 Drawing Sheets

TRANSPARENT LIQUID CRYSTAL DISPLAY DEVICE

FIELD OF THE INVENTION

The present invention relates to a field of display technology, and particularly to a transparent liquid crystal display device.

BACKGROUND OF THE INVENTION

In the prior art, a conventional display device is usually non-transparent. For example, a conventional display device is usually provided with a backlight module for providing light to a liquid crystal cell, so that light passes through a corresponding pixel unit of the liquid crystal cell, thereby displaying an image. Since the backlight module is non-transparent, a viewer cannot see an object or a scene behind the display panel through a screen of the display panel. Therefore, the conventional display device is non-transparent.

Although an OLED display technology has emerged, the back side of a conventional OLED is provided with a metal plate, which is also non-transparent, for reflecting light. Since the metal plate is disposed on the back side of the display panel, a viewer also cannot see an object or a scene behind the display panel through a screen of the display panel. Therefore, the conventional OLED is also non-transparent.

Therefore, it is necessary to provide a transparent display panel, an image to be displayed can be shown by a screen of the display panel, and also an object or a scene behind the display panel can be seen through the screen.

Accordingly, it is necessary to provide a new technical solution to solve the above technical problem.

SUMMARY OF THE INVENTION

An object of the present invention is to provide a transparent liquid crystal display device, an image to be displayed can be shown by a screen of the display panel, and also an object or a scene behind the display panel can be seen through the screen.

In order to solve the above-mentioned problem, the technical solution of the present invention is as follows:

A transparent liquid crystal display device is provided, comprising a transparent liquid crystal cell and a transparent luminous plate; the transparent liquid crystal cell is disposed on the transparent luminous plate.

The transparent luminous plate comprises a first transparent electrode plate, a fluorescent powder layer, a cavity layer, and a second transparent electrode plate; the first transparent electrode plate, the fluorescent powder layer, and the cavity layer are sequentially disposed on the second transparent electrode plate; the fluorescent powder layer is provided with a plurality of fluorescent powder storage units for storing fluorescent powder; the second transparent electrode plate comprises a plurality of transparent electrodes which are connected in series.

The transparent liquid crystal display device further comprises an electron generator disposed on a lateral side of the cavity layer.

Electrons are generated after the electron generator is electrified, the electrons are transmitted into the cavity layer; an electric field E is formed after the first transparent electrode plate and the second transparent electrode plate are electrified; the electric field E induces the electrons generated by the electron generator to move towards the fluorescent powder layer; after the fluorescent powder layer is hit by the electrons, the fluorescent powder layer emits light, which is provided to the transparent liquid crystal cell.

Preferably, the transparent liquid crystal display device further comprises a controller. The transparent liquid crystal cell, the first transparent electrode plate, and the second transparent electrode plate are respectively electrically connected with the controller.

Preferably, the plurality of transparent electrodes have the same sizes and shapes.

Preferably, the plurality of transparent electrodes have different sizes and shapes.

Preferably, one of the fluorescent powder storage units corresponds to a pixel unit of the transparent liquid crystal cell.

Preferably, one of the fluorescent powder storage units corresponds to a plurality of pixel units of the transparent liquid crystal cell.

Preferably, the transparent liquid crystal display device further comprises a transparent display panel disposed on the transparent liquid crystal cell and electrically connected with the controller.

Preferably, the electron generator is disposed on a left-lateral side of the cavity layer.

Preferably, the electron generator is disposed on a right-lateral side of the cavity layer.

A transparent liquid crystal display device is provided, comprising a transparent liquid crystal cell and a transparent luminous plate; the transparent liquid crystal cell is disposed on the transparent luminous plate.

The transparent luminous plate comprises a first transparent electrode plate, a fluorescent powder layer, a cavity layer, and a second transparent electrode plate; the first transparent electrode plate, the fluorescent powder layer, and the cavity layer are sequentially disposed on the second transparent electrode plate.

The transparent liquid crystal display device further comprises an electron generator disposed on a lateral side of the cavity layer.

Electrons are generated after the electron generator is electrified, the electrons are transmitted into the cavity layer; an electric field E is formed after the first transparent electrode plate and the second transparent electrode plate are electrified; the electric field E induces the electrons generated by the electron generator to move towards the fluorescent powder layer; after the fluorescent powder layer is hit by the electrons, the fluorescent powder layer emits light, which is provided to the transparent liquid crystal cell.

Preferably, the transparent liquid crystal display device further comprises a controller. The transparent liquid crystal cell, the first transparent electrode plate, and the second transparent electrode plate are respectively electrically connected with the controller.

Preferably, the second transparent electrode plate comprises a plurality of transparent electrodes which are connected in series.

Preferably, the plurality of transparent electrodes have the same sizes and shapes.

Preferably, the plurality of transparent electrodes have different sizes and shapes.

Preferably, the fluorescent powder layer is provided with a plurality of fluorescent powder storage units for storing fluorescent powder.

Preferably, one of the fluorescent powder storage units corresponds to a pixel unit of the transparent liquid crystal cell.

Preferably, one of the fluorescent powder storage units corresponds to a plurality of pixel units of the transparent liquid crystal cell.

Preferably, the transparent liquid crystal display device further comprises a transparent display panel disposed on the transparent liquid crystal cell and electrically connected with the controller.

Preferably, the electron generator is disposed on a left-lateral side of the cavity layer.

Preferably, the electron generator is disposed on a right-lateral side of the cavity layer.

In comparison to the prior art, a transparent luminous plate and an electron generator are provided by the present invention. The transparent luminous plate comprises a first transparent electrode plate, a fluorescent powder layer, a cavity layer, and a second transparent electrode plate. The first transparent electrode plate, the fluorescent powder layer, and the cavity layer are sequentially disposed on the second transparent electrode plate. The electron generator is disposed on a lateral side of the cavity layer. Electrons are generated after the electron generator is electrified. The electrons are transmitted into the cavity layer. An electric field E is formed after the first transparent electrode plate and the second transparent electrode plate are electrified. The electric field E induces the electrons generated by the electron generator to move towards the fluorescent powder layer. After the fluorescent powder layer is hit by the electrons, the fluorescent powder layer emits light, which is provided to the transparent liquid crystal cell, so that the light passes through a corresponding pixel unit of the liquid crystal cell, thereby displaying an image. Therefore, since the display panel, the liquid crystal cell, and the luminous plate of the present invention are transparent, a viewer cannot only see an image to be displayed by a screen of the display panel, but can also see an object or a scene behind the display panel through the screen.

In order to make the present invention more clear, preferred embodiments and the drawings thereof are described in detail below.

DETAILED DESCRIPTION OF THE INVENTION

The term "embodiment" is used herein to mean serving as an example, instance, or illustration. In addition, the articles "a" and "an" as used in this application and the appended claims should generally be construed to mean "one or more" unless specified otherwise or clear from the context to be directed to a singular form.

In the embodiments of the present invention, a transparent luminous plate and an electron generator are provided. The transparent luminous plate comprises a first transparent electrode plate, a fluorescent powder layer, a cavity layer, and a second transparent electrode plate. The first transparent electrode plate, the fluorescent powder layer, and the cavity layer are sequentially disposed on the second transparent electrode plate. The electron generator is disposed on a lateral side of the cavity layer. Electrons are generated after the electron generator is electrified. The electrons are transmitted into the cavity layer. An electric field E is formed after the first transparent electrode plate and the second transparent electrode plate are electrified. The electric field E induces the electrons generated by the electron generator to move towards the fluorescent powder layer. After the fluorescent powder layer is hit by the electrons, the fluorescent powder layer emits light, which is provided to the transparent liquid crystal cell, so that the light passes through a corresponding pixel unit of the liquid crystal cell, thereby displaying an image. Therefore, since the display panel, the liquid crystal cell, and the luminous plate of the present invention are transparent, a viewer cannot only see an image to be displayed by a screen of the display panel, but can also see an object or a scene behind the display panel through the screen.

First Embodiment

Figure 1:
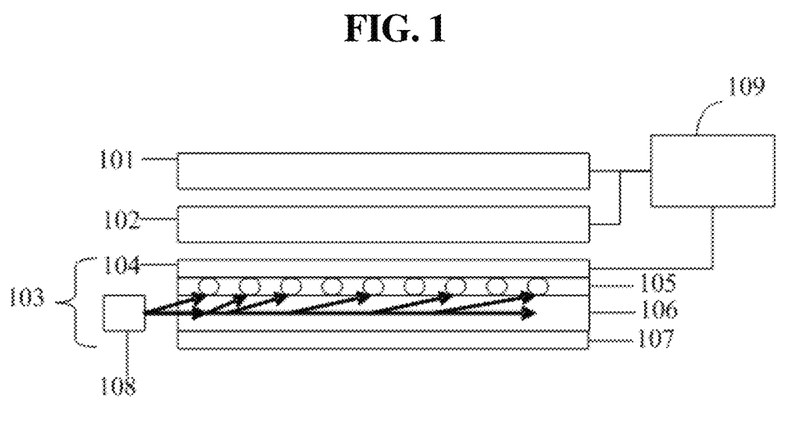
FIG. 1 is a structural schematic diagram of a transparent liquid crystal display device according to a first embodiment of the present invention.

Please refer to FIG. 1, which is a structural schematic diagram of a transparent liquid crystal display device according to the first embodiment of the present invention. For ease of description, only the portion relevant to the embodiment of the present invention is shown.

The transparent liquid crystal display device comprises a transparent display panel 101, a transparent liquid crystal cell 102, and a transparent luminous plate 103. The transparent display panel 101 is disposed on the transparent liquid crystal cell 102. The transparent liquid crystal cell 102 is disposed on the transparent luminous plate 103. The transparent luminous plate 103 is used for generating light, which is provided to the transparent liquid crystal cell 102, so that the light passes through a corresponding pixel unit of the transparent liquid crystal cell 102, thereby displaying an image.

The transparent luminous plate 103 comprises a first transparent electrode plate 104, a fluorescent powder layer 105, a cavity layer 106, and a second transparent electrode plate 107. The first transparent electrode plate 104 is disposed on the fluorescent powder layer 105. The fluorescent powder layer 105 is disposed on the cavity layer 106. The cavity layer 106 is disposed on the second transparent electrode plate 107.

In this embodiment of the present invention, the transparent liquid crystal display device further comprises an electron generator 108 disposed on a lateral side of the cavity layer 106. To be specific, the electron generator 108 is disposed on a left-lateral side of the cavity layer 106, or the electron generator 108 is disposed on a right-lateral side of the cavity layer 106. The electron generator 108 is used for generating electrons, which is transmitted into the cavity layer 106.

However, it should be understood that the transparent display panel 101 may be a transparent touch display panel. Thus, a user can execute a touch operation on the transparent touch display panel by a finger or a stylus. The transparent display panel 101 is optional. For example, when a transparent liquid crystal display device with a touch function is need, the transparent display panel 101 can be disposed on the transparent liquid crystal cell 102. In another example, if the transparent liquid crystal display device does not need a touch function, the transparent display panel 101 does not need to be included. That is, the transparent display panel 101 is not disposed on the transparent liquid crystal cell 102.

In this embodiment of the present invention, the working principle of the transparent liquid crystal display device is described below. Electrons are generated after the electron generator 108 is electrified. The electron is transmitted into the cavity layer 106. An electric field E is formed after the first transparent electrode plate 104 and the second transparent electrode plate 107 are electrified. The electric field E induces the electrons generated by the electron generator 108 move toward to the fluorescent powder layer 105. After the fluorescent powder layer 105 is hit by the electrons, the fluorescent powder layer 105 emits light, which is provided to the transparent liquid crystal cell 102, so that the light passes through a corresponding pixel unit of the liquid crystal cell 102, thereby displaying an image.

In this embodiment of the present invention, the transparent liquid crystal display device further comprises a controller 109. The transparent display panel 101, the transparent liquid crystal cell 102, the first transparent electrode plate 104, and the second transparent electrode plate 107 are respectively electrical connected with the controller 109.

However, it should be understood that the controller 109 is used for adjusting the rotation of liquid crystal of the transparent liquid crystal cell 102. Also, the controller 109 is used for receiving a touch instruction from the transparent display panel 101, and then analyzing the touch instruction. The controller 109 is used for outputting control signals to the first transparent electrode plate 104 and the second transparent electrode plate 107.

In this embodiment of the present invention, fluorescent powder is stored in the fluorescent powder layer 105. After the fluorescent powder layer 105 is hit by the electrons, the fluorescent powder layer 105 emits light, which is provided to the transparent liquid crystal cell 102, so that the light passes through a corresponding pixel unit of the liquid crystal cell 102, thereby displaying an image.

In a preferable embodiment of the present invention, the fluorescent powder layer 105 is provided with a plurality of fluorescent powder storage units for storing the fluorescent powder. The object of disposing the fluorescent powder storage units is to prevent the fluorescent powder from being scattered around. After the fluorescent powder layer 105 is hit by the electrons, the fluorescent powder layer 105 emits light, which is provided to the transparent liquid crystal cell 102, so that the light passes through a corresponding pixel unit of the liquid crystal cell 102, thereby displaying an image.

In this embodiment of the present invention, one of the fluorescent powder storage units corresponds to a plurality of pixel units of the transparent liquid crystal cell. After the fluorescent powder in the fluorescent powder storage units is hit by the electrons, the fluorescent powder layer 105 emits light, which is provided to the transparent liquid crystal cell 102, so that the light passes through a corresponding pixel unit of the liquid crystal cell 102, thereby displaying an image.

Figure 2:
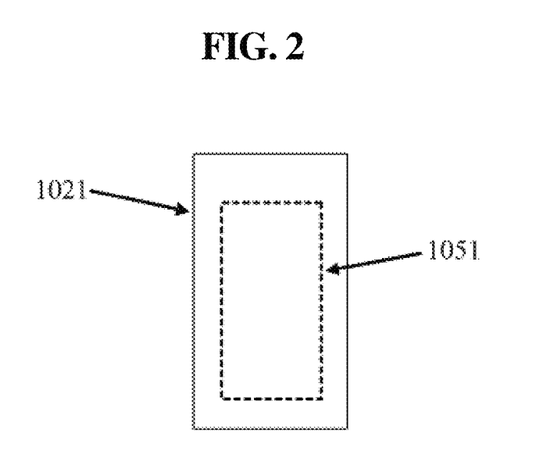
FIG. 2 is a schematic diagram showing the position relation of a pixel unit and a fluorescent powder storage unit according to an embodiment of the present invention.

In a preferable embodiment of the present invention, one fluorescent powder storage unit 1051 corresponds to one pixel unit 1021 of the transparent liquid crystal cell. FIG. 2 shows the position relation of the pixel unit and the fluorescent powder storage unit. Light passing through a corresponding pixel unit of the liquid crystal cell 102 can be increased in a one-to-one manner, thereby increasing the brightness of displaying image.

Figure 3:
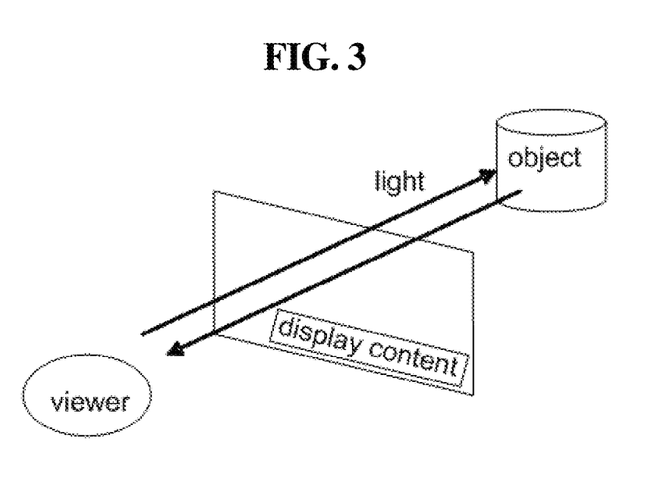
FIG. 3 is a schematic diagram of the transparent liquid crystal display device in a functional state according to an embodiment of the present invention.

Please refer to FIG. 3, which is a schematic diagram of the transparent liquid crystal display device in a functional state according to this embodiment of the present invention. Electrons are generated after the transparent electrode of the electron generator 108 is electrified. The electrons are transmitted into the cavity layer 106. An electric field E is formed after the first transparent electrode plate 104 and the second transparent electrode plate 107 are electrified. The electric field E will induce the electrons generated by the electron generator 108 move toward to the fluorescent powder layer 105. After the fluorescent powder layer 105 is hit by the electrons, the fluorescent powder layer 105 will emit light, which is provided to the transparent liquid crystal cell 102, so that the light passes through a corresponding pixel unit of the liquid crystal cell 102, thereby displaying an image. A viewer can see an image to be displayed by a screen of the display panel. Since the display panel, the liquid crystal cell, and the luminous plate are transparent, the viewer can see an object or a scene behind the display panel through the screen.

From the above, in the first embodiment of the present invention, the electrons are generated after the transparent electrode of the electron generator is electrified. The electrons will be transmitted into the cavity layer. One electric field E is formed after the first transparent electrode plate and the second transparent electrode plate are electrified. The electric field E will induce the electrons generated by the electron generator to move towards the fluorescent powder layer. After the fluorescent powder layer is hit by the electrons, the fluorescent powder layer will emit light, which is provided to the transparent liquid crystal cell, so that the light passes through a corresponding pixel unit of the liquid crystal cell, thereby displaying an image. Therefore, in the first embodiment of the present invention, since the display panel, the liquid crystal cell, and the luminous plate are transparent, a viewer cannot only see an image to be displayed by a screen of the display panel, but can also see an object or a scene behind the display panel through the screen.

Second Embodiment

Figure 4:
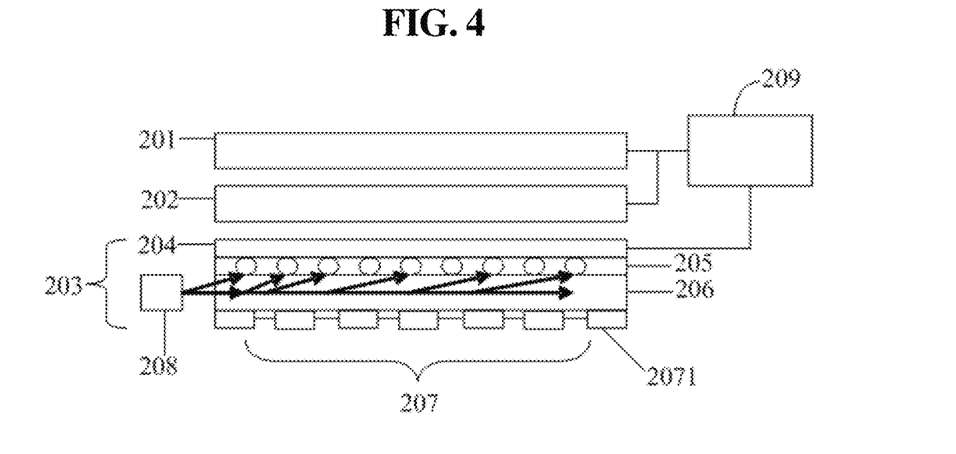
FIG. 4 is a structural schematic diagram of a transparent liquid crystal display device according to a second embodiment of the present invention.
Figure 5:
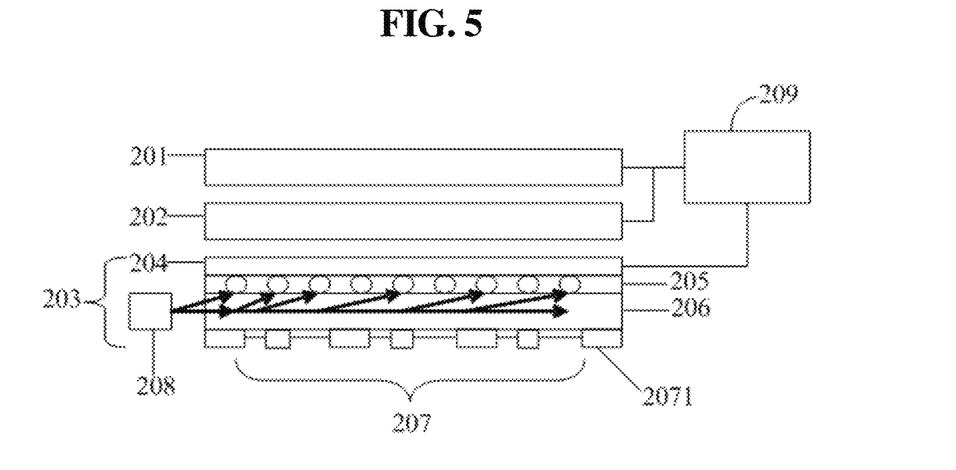
FIG. 5 is another structural schematic diagram of the transparent liquid crystal display device according to the second embodiment of the present invention.

Please refer to FIG. 4 and FIG. 5, which show a schematic diagram of a transparent liquid crystal display device according to a second embodiment of the present invention. For ease of description, only the portion relevant to the embodiment of the present invention are shown.

The transparent liquid crystal display device comprises a transparent display panel 201, a transparent liquid crystal cell 202, and a transparent luminous plate 203. The transparent display panel 201 is disposed on the transparent liquid crystal cell 202. The transparent liquid crystal cell 202 is disposed on the transparent luminous plate 203. The transparent luminous plate 203 is used for generating light, which is provided to the transparent liquid crystal cell 202, so that the light passes through a corresponding pixel unit of the transparent liquid crystal cell 202, thereby displaying an image.

The transparent luminous plate 203 comprises a first transparent electrode plate 204, a fluorescent powder layer 205, a cavity layer 206, and a second transparent electrode plate 207. The first transparent electrode plate 204 is disposed on the fluorescent powder layer 205. The fluorescent powder layer 205 is disposed on the cavity layer 206. The cavity layer 206 is disposed on the second transparent electrode plate 207.

In this embodiment of the present invention, the transparent liquid crystal display device further comprises an electron generator 208 disposed on a lateral side of the cavity layer 206. To be specific, the electron generator 208 is disposed on a left-lateral side of the cavity layer 206, or the electron generator 208 disposed on a right-lateral side of the cavity layer 206. The electron generator 208 is sued for generating electrons, which is transmitted into the cavity layer 206.

However, it should be understood that the transparent display panel 201 may be a transparent touch display panel. Thus, a user can execute a touch operation on the transparent touch display panel by a finger or a stylus. The transparent display panel 201 is optional. For example, when a transparent liquid crystal display device with a touch function is need, the transparent display panel 201 can be disposed on the transparent liquid crystal cell 202. In another example, if the transparent liquid crystal display device does not need a touch function, the transparent display panel 201 does not need to be included. That is, the transparent display panel 201 is not disposed on the transparent liquid crystal cell 202.

In this embodiment of the present invention, the working principle of the transparent liquid crystal display device is described below. Electrons are generated after the electron generator 208 is electrified. The electron is transmitted into the cavity layer 206. An electric field E is formed after the first transparent electrode plate 204 and the second transparent electrode plate 207 are electrified. The electric field E induces the electrons generated by the electron generator 208 move toward to the fluorescent powder layer 205. After the fluorescent powder layer 205 is hit by the electrons, the fluorescent powder layer 205 emits light, which is provided to the transparent liquid crystal cell 202, so that the light passes through a corresponding pixel unit of the liquid crystal cell 202, thereby displaying an image.

In this embodiment of the present invention, the transparent liquid crystal display device further comprises a controller 209. The transparent display panel 201, the transparent liquid crystal cell 202, the first transparent electrode plate 204, and the second transparent electrode plate 207 are respectively electrical connected with the controller 209.

However, it should be understood that the controller 209 is used for adjusting the rotation of liquid crystal of the transparent liquid crystal cell 202. Also, the controller 209 is used for receiving a touch instruction from the transparent display panel 201, and then analyzing the touch instruction. The controller 209 is used for outputting control signals to the first transparent electrode plate 204 and the second transparent electrode plate 207.

In this embodiment of the present invention, fluorescent powder is stored in the fluorescent powder layer 205. After the fluorescent powder layer 205 is hit by the electrons, the fluorescent powder layer 205 emits light, which is provided to the transparent liquid crystal cell 202, so that the light passes through a corresponding pixel unit of the liquid crystal cell 202, thereby displaying an image.

In a preferable embodiment of the present invention, the fluorescent powder layer 205 is provided with a plurality of fluorescent powder storage units for storing the fluorescent powder. The object of disposing the fluorescent powder storage units is to prevent the fluorescent powder from being scattered around. After the fluorescent powder layer 205 is hit by the electrons, the fluorescent powder layer 205 emits light, which is provided to the transparent liquid crystal cell 202, so that the light passes through a corresponding pixel unit of the liquid crystal cell 202, thereby displaying an image.

In this embodiment of the present invention, one of the fluorescent powder storage units corresponds to a plurality of pixel units of the transparent liquid crystal cell. After the fluorescent powder in the fluorescent powder storage units is hit by the electrons, the fluorescent powder layer 205 emits light, which is provided to the transparent liquid crystal cell 202, so that the light passes through a corresponding pixel unit of the liquid crystal cell 202, thereby displaying an image.

In a preferable embodiment of the present invention, one fluorescent powder storage unit corresponds to one pixel unit of the transparent liquid crystal cell. FIG. 2 shows the position relation of the pixel unit and the fluorescent powder storage unit. Light passing through a corresponding pixel unit of the liquid crystal cell 202 can be increased in a one-to-one manner, thereby increasing the brightness of displaying image.

In a preferable embodiment of the present invention, the second transparent electrode plate 207 comprises a plurality of transparent electrodes 2071, which are connected in series. As shown on FIG. 4, the transparent electrodes 2071 have the same shapes and sizes. In this embodiment, the advantage of dividing the second transparent electrode plate 207 into a plurality of transparent electrodes is that a strong electric field E is formed after the first transparent electrode plate 204 and the second transparent electrode plate 207 are electrified. The electric field E can efficiently induce the electrons generated by the electron generator 208 to move towards the fluorescent powder layer 205.

In another preferable embodiment of the present invention, the second transparent electrode plate 207 comprises a plurality of transparent electrodes 2071, which are connected in series. As shown on FIG. 5, the transparent electrodes 2071 have different shapes and sizes. In this embodiment, the advantage of dividing the second transparent electrode plate 207 into a plurality of transparent electrodes is that a strong electric field E is formed after the first transparent electrode plate 204 and the second transparent electrode plate 207 are electrified. The electric field E can efficiently induce the electrons generated by the electron generator 208 to move towards the fluorescent powder layer 205.

Please refer to FIG. 3, which shows a schematic diagram of the transparent liquid crystal display device in a functional state according to this embodiment of the present invention. Electrons are generated after the transparent electrode of the electron generator 208 is electrified. The electrons are transmitted into the cavity layer 206. An electric field E is formed after the first transparent electrode plate 204 and the second transparent electrode plate 207 are electrified. The electric field E will induce the electrons generated by the electron generator 208 to move towards the fluorescent powder layer 205. After the fluorescent powder layer 205 is hit by the electrons, the fluorescent powder layer 205 will emit light, which is provided to the transparent liquid crystal cell 202, so that the light passes through a corresponding pixel unit of the liquid crystal cell 202, thereby displaying an image. A viewer can see an image to be displayed by a screen of the display panel. Since the display panel, the liquid crystal cell, and the luminous plate are transparent, the viewer can see an object or a scene behind the display panel through the screen.

From the above, in the second embodiment of the present invention, the electrons are generated after the electron generator is electrified. The electrons will be transmitted into the cavity layer. One electric field E is formed after the first transparent electrode plate and the second transparent electrode plate are electrified. The electric field E will induce the electrons generated by the electron generator to move towards the fluorescent powder layer. After the fluorescent powder layer is hit by the electrons, the fluorescent powder layer will emit light, which is provided to the transparent liquid crystal cell, so that the light passes through a corresponding pixel unit of the liquid crystal cell, thereby displaying an image. Therefore, in the second embodiment of the present invention, since the display panel, the liquid crystal cell, and the luminous plate are transparent, a viewer cannot only see an image to be displayed by a screen of the display panel, but can also see an object or a scene behind the display panel through the screen.

From the above, in the embodiments of the present invention, the transparent liquid crystal display device is provided with transparent luminous plate and electron generator. The transparent luminous plate comprises a first transparent electrode plate, a fluorescent powder layer, a cavity layer, and a second transparent electrode plate. The first transparent electrode plate, the fluorescent powder layer, and the cavity layer are sequentially disposed on the second transparent electrode plate. The electron generator is disposed on a lateral side of the cavity layer. Electrons are generated after the electron generator is electrified. The electrons are transmitted into the cavity layer. An electric field E is formed after the first transparent electrode plate and the second transparent electrode plate are electrified. The electric field E will induce the electrons generated by the electron generator to move towards the fluorescent powder layer. After the fluorescent powder layer is hit by the electrons, the fluorescent powder layer will emit light, which is provided to the transparent liquid crystal cell, so that the light passes through a corresponding pixel unit of the liquid crystal cell, thereby displaying an image. Therefore, in the present invention, since the display panel, the liquid crystal cell, and the luminous plate are transparent, a viewer cannot only see an image to be displayed by a screen of the display panel, but can also see an object or a scene behind the display panel through the screen.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular, with regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such a feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The above descriptions are merely preferable embodiments of the present invention, but are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A transparent liquid crystal display device, comprising a transparent liquid crystal cell and a transparent luminous plate; the transparent liquid crystal cell being disposed on the transparent luminous plate,
    wherein the transparent luminous plate comprises a first transparent electrode plate, a fluorescent powder layer, a cavity layer, and a second transparent electrode plate; the first transparent electrode plate, the fluorescent powder layer, and the cavity layer are sequentially disposed on the second transparent electrode plate; the fluorescent powder layer is provided with a plurality of fluorescent powder storage units for storing fluorescent powder; the second transparent electrode plate comprises a plurality of transparent electrodes which are connected in series;
    the transparent liquid crystal display device further comprises an electron generator disposed on a lateral side of the cavity layer;
    electrons are generated after the electron generator is electrified, the electrons are transmitted into the cavity layer; an electric field E is formed after the first transparent electrode plate and the second transparent electrode plate are electrified; the electric field E induces the electrons generated by the electron generator to move towards the fluorescent powder layer; after the fluorescent powder layer is hit by the electrons, the fluorescent powder layer emits light, which is provided to the transparent liquid crystal cell.

2. The transparent liquid crystal display device according to claim 1, wherein the transparent liquid crystal display device further comprises a controller, the transparent liquid crystal cell, the first transparent electrode plate, and the second transparent electrode plate are respectively electrically connected with the controller.

3. The transparent liquid crystal display device according to claim 2, wherein the transparent liquid crystal display device further comprises a transparent display panel disposed on the transparent liquid crystal cell and electrically connected with the controller.

4. The transparent liquid crystal display device according to claim 1, wherein the plurality of transparent electrodes have the same sizes and shapes.

5. The transparent liquid crystal display device according to claim 1, wherein the plurality of transparent electrodes have different sizes and shapes.

6. The transparent liquid crystal display device according to claim 1, wherein one of the fluorescent powder storage units corresponds to a pixel unit of the transparent liquid crystal cell.

7. The transparent liquid crystal display device according to claim 1, wherein one of the fluorescent powder storage units corresponds to a plurality of pixel units of the transparent liquid crystal cell.

8. The transparent liquid crystal display device according to claim 1, wherein the electron generator is disposed on a left-lateral side of the cavity layer.

9. The transparent liquid crystal display device according to claim 1, wherein the electron generator is disposed on a right-lateral side of the cavity layer.

10. A transparent liquid crystal display device, comprising a transparent liquid crystal cell and a transparent luminous plate; the transparent liquid crystal cell is disposed on the transparent luminous plate,
- wherein the transparent luminous plate comprises a first transparent electrode plate, a fluorescent powder layer, a cavity layer, and a second transparent electrode plate; the first transparent electrode plate, the fluorescent powder layer, and the cavity layer are sequentially disposed on the second transparent electrode plate;
- the transparent liquid crystal display device further comprises an electron generator disposed on a lateral side of the cavity layer;
- electrons are generated after the electron generator is electrified, the electrons are transmitted into the cavity layer; an electric field E is formed after the first transparent electrode plate and the second transparent electrode plate are electrified; the electric field E induces the electrons generated by the electron generator to move towards the fluorescent powder layer; after the fluorescent powder layer is hit by the electrons, the fluorescent powder layer emits light, which is provided to the transparent liquid crystal cell.

11. The transparent liquid crystal display device according to claim 10, wherein the transparent liquid crystal display device further comprises a controller, the transparent liquid crystal cell, the first transparent electrode plate, and the second transparent electrode plate are respectively electrically connected with the controller.

12. The transparent liquid crystal display device according to claim 11, wherein the transparent liquid crystal display device further comprises a transparent display panel disposed on the transparent liquid crystal cell and electrically connected with the controller.

13. The transparent liquid crystal display device according to claim 10, wherein the second transparent electrode plate comprises a plurality of transparent electrodes which are connected in series.

14. The transparent liquid crystal display device according to claim 13, wherein the plurality of transparent electrodes have the same sizes and shapes.

15. The transparent liquid crystal display device according to claim 13, wherein the plurality of transparent electrodes have different sizes and shapes.

16. The transparent liquid crystal display device according to claim 10, wherein the fluorescent powder layer is provided with a plurality of fluorescent powder storage units for storing fluorescent powder.

17. The transparent liquid crystal display device according to claim 16, wherein one of the fluorescent powder storage units corresponds to a pixel unit of the transparent liquid crystal cell.

18. The transparent liquid crystal display device according to claim 16, wherein one of the fluorescent powder storage units corresponds to a plurality of pixel units of the transparent liquid crystal cell.

19. The transparent liquid crystal display device according to claim 10, wherein the electron generator is disposed on a left-lateral side of the cavity layer.

20. The transparent liquid crystal display device according to claim 10, wherein the electron generator is disposed on a right-lateral side of the cavity layer.

* * * * *